(12) United States Patent
Ogawa et al.

(10) Patent No.: US 10,202,487 B2
(45) Date of Patent: Feb. 12, 2019

(54) POLYARYLATE AND MOLDED ARTICLE USING SAME

(71) Applicant: MITSUBISHI GAS CHEMICAL COMPANY, INC., Tokyo (JP)

(72) Inventors: Noriyoshi Ogawa, Ibaraki (JP); Hiroo Katagiri, Kanagawa (JP); Genki Sugiyama, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 528 days.

(21) Appl. No.: 14/758,608

(22) PCT Filed: Jan. 21, 2014

(86) PCT No.: PCT/JP2014/051035
§ 371 (c)(1),
(2) Date: Jun. 30, 2015

(87) PCT Pub. No.: WO2014/115694
PCT Pub. Date: Jul. 31, 2014

(65) Prior Publication Data
US 2015/0337079 A1 Nov. 26, 2015

(30) Foreign Application Priority Data

Jan. 24, 2013 (JP) ................................. 2013-011111
Jan. 24, 2013 (JP) ................................. 2013-011116

(51) Int. Cl.
| C08G 63/183 | (2006.01) |
| C08J 5/18 | (2006.01) |
| C08G 63/193 | (2006.01) |
| C08G 63/199 | (2006.01) |

(52) U.S. Cl.
CPC ......... *C08G 63/183* (2013.01); *C08G 63/193* (2013.01); *C08J 5/18* (2013.01); *C08G 63/199* (2013.01); *C08J 2467/03* (2013.01)

(58) Field of Classification Search
CPC ...... C08G 63/16; C08G 63/18; C08G 63/183; C08G 63/193; C08G 63/199
See application file for complete search history.

(56) References Cited

U.S. PATENT DOCUMENTS

| 3,240,735 A * | 3/1966 | Caldwell ............. C08K 5/0008 430/533 |
| 4,275,188 A * | 6/1981 | Berger ................. C08G 63/193 528/193 |
| 4,438,241 A * | 3/1984 | Mark .................... C08G 63/193 525/437 |
| 4,631,334 A | 12/1986 | Masumoto et al. |
| 4,701,515 A * | 10/1987 | Dicke ................. C09K 19/3809 528/176 |
| 6,288,205 B1 | 9/2001 | Miyamoto et al. |
| 6,294,641 B1 | 9/2001 | Miyamoto et al. |
| 8,404,414 B2 | 3/2013 | Takaki et al. |
| 2003/0087173 A1* | 5/2003 | Kumano ............. C08G 63/193 430/96 |
| 2003/0105271 A1* | 6/2003 | Brack .................... C08G 64/14 528/196 |
| 2006/0073400 A1 | 4/2006 | Kumano |
| 2010/0188749 A1 | 7/2010 | Hirayama et al. |
| 2011/0189603 A1 | 9/2011 | Ueno et al. |
| 2012/0172570 A1* | 7/2012 | Tabata .................... C08G 63/19 528/176 |
| 2012/0282397 A1 | 11/2012 | Hirayama et al. |

FOREIGN PATENT DOCUMENTS

| JP | S59133221 A | 7/1984 |
| JP | S60203632 A | 10/1985 |

(Continued)

OTHER PUBLICATIONS

JP 4-288325 A (Oct. 13, 1992); machine translation.*

(Continued)

*Primary Examiner* — Rip A Lee
(74) *Attorney, Agent, or Firm* — Greenblum & Bernstein, P.L.C.

(57) ABSTRACT

The present invention can provide a polyarylate obtained from a dihydric phenol component and an aromatic dicarboxylic acid component. The polyarylate is characterized in that the dihydric phenol component contains a compound represented by general formula (A) or (B) as a primary raw material, and the pencil hardness of the polyarylate is H or higher.

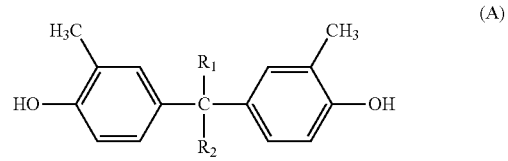

(A)

(In the formula, $R_1$ and $R_2$ each independently denote a hydrogen atom, an alkyl group having 1-6 carbon atoms or a phenyl group. However, neither $R_1$ nor $R_2$ represents a methyl group.)

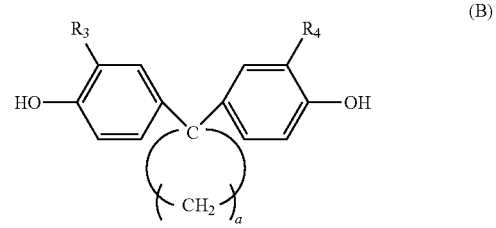

(B)

(In the formula, $R_3$ and $R_4$ each independently denote a hydrogen atom or a methyl group. In addition, a is an integer between 4 and 11. However, a is not 5 if $R_3$ and $R_4$ are both hydrogen atoms.)

16 Claims, No Drawings

(56) References Cited

FOREIGN PATENT DOCUMENTS

| JP | 4-288325 A | * 10/1992 | ........... C08G 63/181 |
|----|------------|-----------|-------------------------|
| JP | 6-107778 | 4/1994 | |
| JP | 6-184287 | 7/1994 | |
| JP | 7-25871 | 3/1995 | |
| JP | H07-157551 A | 6/1995 | |
| JP | H07-179579 A | 7/1995 | |
| JP | 9-73183 | 3/1997 | |
| JP | 11-269260 | 10/1999 | |
| JP | 11-302364 | 11/1999 | |
| JP | 2000-302853 | 10/2000 | |
| JP | 2008-293006 | 12/2008 | |
| JP | 2009-86604 | 4/2009 | |
| JP | 2009-255521 | 11/2009 | |
| JP | 2009271152 A | 11/2009 | |
| JP | 2010-126652 | 6/2010 | |

OTHER PUBLICATIONS

International Search Report issued in PCT/JP2014/051035, dated Apr. 22, 2014.
Partial Supplementary European Search Report issued in Patent Application No. 14743237.1, dated Aug. 10, 2016.
http://www.meti.go.jp/report/downloadfiles/g20515b14j.pdf, Dec. 8, 2017.
http://www.env.go.jp/chemi/report/h15-01/pdf/chap01-02-2/13.pdf, Dec. 8, 2017.
http://www.tokyo-eiken.go.jp/assets/topics/endocrin/page59.pdf, Dec. 8, 2017.

* cited by examiner

POLYARYLATE AND MOLDED ARTICLE USING SAME

TECHNICAL FIELD

The present invention relates to a polyarylate having a high pencil hardness and a molded article thereof, and relates to a film suitable for applications requiring scratch resistance, particularly for a constituent material for a flat panel display. The present invention also relates to a polyarylate having high melt flowability and a molded article using the same.

BACKGROUND ART

Amorphous polyarylates induced from 2,2-bis(4-hydroxyphenyl)propane (hereinafter referred to as "bisphenol A") and terephthalic acid and isophthalic acids are known as engineering plastics. Such polyarylates have high heat resistance and excellent mechanical strength typified by impact strength and dimensional stability, and in addition, amorphous polyarylates are transparent. Therefore, molded articles thereof are widely applied to fields of electricity, electronics, automobiles, machines, etc.

Recently, liquid crystal displays, organic electroluminescence displays and flat panel displays such as electronic papers used in the field of mobile devices such as mobile phones, portable game devices, smartphones and electronic book readers have been designed based on the premise of operation by direct contact with a screen by fingertips. Therefore, a scratch may be caused by scratching by nails at the time of operation or contact with other articles at the time of transportation. For this reason, display members made of high-hardness glass plates were mainly used at first. However, such members are easily broken by impact at the time of sudden fall, shake, twist, etc., and there is a drawback that such members become heavier because the thickness thereof must be increased in order to enhance the strength thereof. For this reason, acrylic resin which is a transparent resin and polycarbonate resin treated with hard coating are used instead of glass (Patent Document 1).

However, with respect to polyarylate resin which has similar transparency, though various polyarylates have been developed, scratch resistance is not necessarily satisfied thereby, and there is a room for improvement (Patent Document 2).

In addition, polyarylates have excellent heat resistance, but melt flowability thereof is exerted only at high temperatures, and at the time of injection molding, it is required to mold such polyarylates at a temperature of 350° C. or higher. Therefore, various additives such as a mold release agent, antioxidant, ultraviolet absorber and dye added to such polyarylates may be decomposed to be accumulated on a mold, or a bubble defect may be generated in resin, and there is a room for improvement of maintenance properties and yield.

Meanwhile, there is a case where compatibility with polyamide and weather resistance were improved by modifying a molecular end of a polyarylate, but there is no description regarding improvement of flowability of the polyarylate alone at the time of molding by heating and melting (Patent Documents 3 and 4). Further, there is a case where toner-cleaning properties of an electrophotographic photoreceptor were improved by using a polyarylate having a long-chain fluoroalkyl group at its molecular end, but this is a case of wet molding, and there is no description regarding improvement of flowability at the time of molding by heating and melting. In addition, since fluorine compounds are expensive, there is a need for improvement of flowability with use of an inexpensive material (Patent Document 5).

PRIOR ART DOCUMENTS

Patent Documents

Patent Document 1: Japanese Laid-Open Patent Publication No. 2009-255521
Patent Document 2: Japanese Laid-Open Patent Publication No. H11-302364
Patent Document 3: Japanese Laid-Open Patent Publication No. H06-107778
Patent Document 4: Japanese Laid-Open Patent Publication No. H06-184287
Patent Document 5: Japanese Laid-Open Patent Publication No. H09-73183

SUMMARY OF THE INVENTION

Problems to be Solved by the Invention

The problem to be solved by the present invention is to provide a polyarylate having a high pencil hardness and excellent scratch resistance and a molded article and a film using the same. In addition, another problem to be solved by the present invention is to provide a polyarylate showing high flowability at a temperature lower than conventional cases and a molded article using the same.

Means for Solving the Problems

The present inventors diligently made researches in order to solve the above-described problems and found that a molded article made of a polyarylate induced from a dihydric phenol having a specific structure has a high pencil hardness and excellent scratch resistance, and thus the present invention was achieved. Moreover, the present inventors found that a polyarylate having a specific molecular end structure shows high flowability at low temperature, and thus the present invention was achieved.

Specifically, the present invention relates to a polyarylate and a molded article using the same as described below:

<1> A polyarylate obtained from a dihydric phenol component and an aromatic dicarboxylic acid component, wherein the dihydric phenol component contains a compound represented by general formula (A) or (B) as a primary raw material, and wherein the pencil hardness of the polyarylate is H or higher:

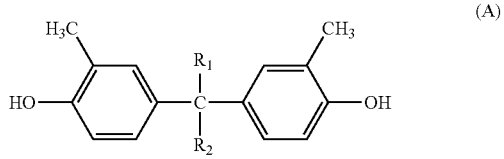
(A)

wherein in the formula, $R_1$ and $R_2$ each independently represent a hydrogen atom, an alkyl group having 1 to 6 carbon atoms or a phenyl group, but neither $R_1$ nor $R_2$ represents a methyl group;

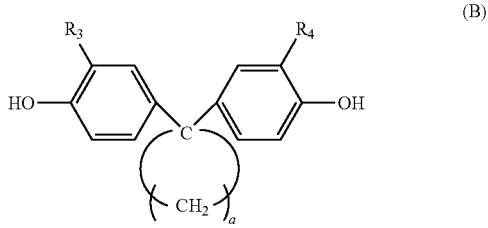

wherein in the formula, $R_3$ and $R_4$ each independently represent a hydrogen atom or a methyl group, and a is an integer of 4 to 11, but a is not 5 if $R_3$ and $R_4$ are both hydrogen atoms.

<2> The polyarylate according to item <1>, wherein the dihydric phenol component is at least one selected from the group consisting of 1,1-bis(4-hydroxy-3-methylphenyl)cyclohexane, 1,1-bis(4-hydroxy-3-methylphenyl)cyclododecane, 1,1-bis(4-hydroxy)cyclododecane and 1,1-bis(4-hydroxy-3-methylphenyl)-1-phenylethane.

<3> The polyarylate according to item <1> or <2>, wherein the polystyrene equivalent weight-average molecular weight measured by gel permeation chromatography is 20000 or more and less than 150000.

<4> A molded article made by molding the polyarylate according to any one of items <1> to <3>.

<5> A film made from the molded article according to item <4>.

<6> The film according to item <5>, which has a thickness of 5 to 200 μm.

<7> The film according to item <5> or <6>, which is obtained by means of wet molding or extrusion molding.

<8> The film according to any one of items <5> to <7>, which is used as a constituent material for a flat panel display.

<9> The film according to item <8>, which is used as a constituent material for a mobile terminal display.

<10> A polyarylate obtained from a dihydric phenol component and an aromatic dicarboxylic acid component, wherein a compound represented by general formula (C) is used at the molecular end of the polyarylate, and wherein the Q value (the amount of molten resin flowing out from a nozzle hole having a diameter of 1 mm and a length of 10 mm using Koka flow tester (high-load-type flow tester) at a temperature of 280° C. under a pressure of 15.69 MPa) is $1 \times 10^{-2}$ cm$^3$/sec or more:

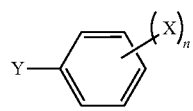

wherein in the formula, Y represents a hydroxyl group or an acid chloride, n is an integer of 1 to 3, and X is

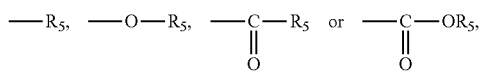

wherein each $R_5$ represents a branched or unbranched alkyl group having 5 to 20 carbon atoms.

<11> The polyarylate according to item <10>, wherein the compound represented by general formula (C) is at least one selected from the group consisting of ortho-t-amylphenol, para-t-octylphenol, para-nonylphenol, para-dodecylphenol, 2,4-di-t-amylphenol and 2-ethylhexyl 4-hydroxybenzoate.

<12> The polyarylate according to item <10> or <11>, wherein the dihydric phenol component is at least one selected from the group consisting of bis(4-hydroxyphenyl) ether, 4,4'-[1,3-phenylenebis(1-methylethylidene)]bisphenol, 2,2-bis(4-hydroxyphenyl)-4-methylpentane, 2,2-bis(4-hydroxyphenyl)propane, 2,2-bis(4-hydroxy-3-methylphenyl)propane, 1,1-bis(4-hydroxyphenyl)ethane and 1,1-bis(4-hydroxy-3-methylphenyl)cyclohexane.

<13> The polyarylate according to any one of items <10> to <12>, wherein the polystyrene equivalent weight-average molecular weight measured by gel permeation chromatography is 20000 or more and less than 80000.

<14> A molded article made by molding the polyarylate according to any one of items <10> to <13>.

<15> The molded article according to item <14>, which is obtained by injection molding.

<16> The molded article according to item <14>, which is obtained by extrusion molding.

Advantageous Effect of the Invention

According to the present invention, a polyarylate having a high pencil hardness and a molded article using the same can be obtained, and in particular, a film having excellent scratch resistance can be obtained. Moreover, according to the present invention, a polyarylate showing high flowability at a temperature lower than conventional cases and a molded article using the same can be obtained. Furthermore, mold contamination at the time of injection molding is suppressed and ease of maintenance is provided.

EMBODIMENTS FOR CARRYING OUT THE INVENTION

Hereinafter, the first embodiment of the present invention will be described in detail.

The first embodiment of the present invention is a polyarylate obtained from a dihydric phenol component and an aromatic dicarboxylic acid component, wherein the dihydric phenol component contains a compound represented by general formula (A) or (B) as a primary raw material, and wherein the pencil hardness of the polyarylate is H or higher:

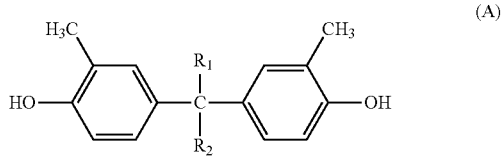

wherein in the formula, $R_1$ and $R_2$ each independently represent a hydrogen atom, an alkyl group having 1 to 6 carbon atoms or a phenyl group, but neither $R_1$ nor $R_2$ represents a methyl group;

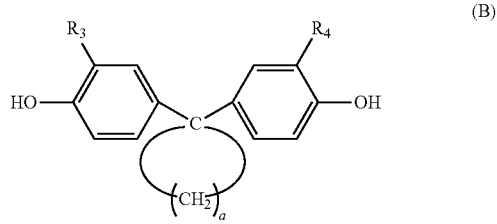

wherein in the formula, $R_3$ and $R_4$ each independently represent a hydrogen atom or a methyl group, and a is an integer of 4 to 11, but a is not 5 if $R_3$ and $R_4$ are both hydrogen atoms.

The polyarylate in the first embodiment of the present invention is a polyarylate obtained from a dihydric phenol component and an aromatic dicarboxylic acid component, and specifically, it is an aromatic polyester consisting of a bisphenol residue and an aromatic dicarboxylic acid residue. As production methods thereof, the interfacial polymerization method, the solution polymerization method, the melt polymerization method, etc. are publicly known. In particular, polyarylate resin produced by the interfacial polymerization method has good color tone and physical properties, and therefore is preferred.

In the first embodiment of the present invention, examples of the dihydric phenol represented by general formula (A) include 1,1-bis(4-hydroxy-3-methylphenyl)-1-phenylethane, bis(4-hydroxy-3-methylphenyl)diphenylmethane, 1,1-bis(4-hydroxy-3-methylphenyl)ethane, bis(4-hydroxy-3-methylphenyl)methane, 2,2-bis(4-hydroxy-3-methylphenyl)butane, 2,2-bis(4-hydroxy-3-methylphenyl)-4-methylpentane, 1,1-bis(4-hydroxy-3-methylphenyl)-2-methylpropane and bis(4-hydroxy-3-methylphenyl)phenylmethane. Two or more of these compounds may be used in combination. Further, among them, 1,1-bis(4-hydroxy-3-methylphenyl)-1-phenylethane is particularly preferred.

In the first embodiment of the present invention, examples of the dihydric phenol represented by general formula (B) include 1,1-bis(4-hydroxy-3-methylphenyl)cyclohexane, 1,1-bis(4-hydroxy-3-methylphenyl)cyclododecane, 1,1-bis(4-hydroxyphenyl)cyclododecane, 1,1-bis(4-hydroxy-3-methylphenyl)cyclopentane, 1,1-bis(4-hydroxyphenyl)cycloheptane, 1,1-bis(4-hydroxy-3-methylphenyl)cycloheptane, 1,1-bis(4-hydroxyphenyl)cyclooctane and 1,1-bis(4-hydroxy-3-methylphenyl)cyclooctane. Two or more of these compounds may be used in combination. Further, among them, 1,1-bis(4-hydroxy-3-methylphenyl)cyclohexane, 1,1-bis(4-hydroxy-3-methylphenyl)cyclododecane and 1,1-bis(4-hydroxyphenyl)cyclododecane are particularly preferred.

The polyarylate in the first embodiment of the present invention contains the dihydric phenol represented by general formula (A) or (B) as the primary component, and specifically, the ratio of the dihydric phenol represented by general formula (A) or (B) relative to the total amount of dihydric phenols used is 50 mol % or more, and more preferably 70 mol % or more.

Specific examples of dihydric phenols which can be used other than the aforementioned dihydric phenol represented by general formula (A) or (B) as the primary component include 2,2-bis(4-hydroxyphenyl)propane (bisphenol A), 1,1'-biphenyl-4,4'-diol, 1,1'-biphenyl-3,3'-dimethyl-4,4'-diol, bis(4-hydroxyphenyl)methane, 1,1-bis(4-hydroxyphenyl)ethane, bis(4-hydroxyphenyl)ether, bis(4-hydroxy-3-methylphenyl)ether, bis(4-hydroxyphenyl)sulfoxide, bis(4-hydroxyphenyl)sulfide, bis(4-hydroxyphenyl)sulfone, bis(4-hydroxy-3-methylphenyl)sulfone, bis(4-hydroxyphenyl)ketone, 2,2-bis(4-hydroxy-3-methylphenyl)propane, 2,2-bis(4-hydroxy-3-t-butylphenyl)propane, 1,1-bis(4-hydroxyphenyl)cyclohexane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane and 4,4'-[1,3-phenylenebis(1-methylethylidene)]bisphenol. Two or more of these compounds may be used in combination. Further, among them, 2,2-bis(4-hydroxy-3-methylphenyl)propane, 1,1-bis(4-hydroxyphenyl)cyclohexane, 9,9-bis(4-hydroxy-3-methylphenyl)fluorene and bisphenol A are preferred.

Examples of the aromatic dicarboxylic acid component constituting the polyarylate in the first embodiment of the present invention include terephthalic acid, isophthalic acid, phthalic acid, 2,6-naphthalenedicarboxylic acid, 3-tert-butylisophthalic acid, diphenic acid, 4,4'-dicarboxylic acid and acid chlorides thereof. These divalent dicarboxylic acids may be used solely, or two or more of them may be used in combination. Aromatic dicarboxylic acids which can be particularly preferably used are terephthalic acid, isophthalic acid and acid chlorides thereof.

In the case where the polyarylate in the first embodiment of the present invention is produced by the interfacial polymerization method, an aqueous phase in which the aforementioned dihydric phenols, an alkali and a polymerization catalyst are dissolved is mixed with 0.11 organic phase in which the aromatic dicarboxylic acid component is dissolved, and the mixture is subjected to an interfacial polycondensation reaction with stirring, thereby obtaining the polyarylate.

In this case, the polymerization catalyst is preferably a quaternary ammonium salt, and specific examples thereof include tri-n-butylbenzyl ammonium chloride, tri-n-butylbenzyl ammonium bromide, tri-n-butylbenzyl ammonium hydroxide, tri-n-butylbenzyl ammonium hydrogen sulfate, tetra-n-butyl ammonium chloride, tetra-n-butyl ammonium bromide, tetra-n-butyl ammonium hydroxide and tetra-n-butyl ammonium hydrogen sulfate.

Examples of the alkali to be used in the aqueous phase include sodium hydroxide and potassium hydroxide.

As a solvent to be used in the organic phase, a solvent which is incompatible with water and dissolves a polyarylate resin produced is used, and specific examples thereof include chlorine-based solvents such as methylene chloride, 1,2-dichloroethane, chloroform, carbon tetrachloride, chlorobenzene, 1,1,2,2-tetrachloroethane, 1,1,1-trichloroethane, o-dichlorobenzene, m-dichlorobenzene and p-dichlorobenzene, and aromatic hydrocarbons such as toluene, benzene and xylene.

In order to adjust the molecular weight of the polyarylate in the first embodiment of the present invention, an end terminator can be used at the time of polymerization. Examples of the end terminator include monovalent phenols such as phenol, cresol and p-tert-butylphenol, and monovalent acid chlorides such as benzoic acid chloride, methanesulfonyl chloride and phenylchloro formate. Moreover, if desired, a small amount of an antioxidant such as sodium sulfite and hydrosulfite and a branching agent such as phloroglucin, isatin bisphenol and trisphenolethane may be added.

Regarding the polyarylate in the first embodiment of the present invention, the polystyrene equivalent weight-average molecular weight (Mw) thereof measured by gel permeation chromatography (hereinafter abbreviated as "GPC") is preferably 20000 or more and less than 150000. Further, the polystyrene equivalent number-average molecular weight (Mn) thereof is preferably 4000 or more and less than 80000.

The polyarylate in the first embodiment of the present invention can be molded by a publicly-known method such as wet molding, extrusion molding, blow molding and injection molding, and further, it can be molded into a film by means of wet molding or extrusion molding.

The thickness of the film obtained from the polyarylate in the first embodiment of the present invention is preferably in the range of from 5 to 200 μm. When the thickness is 5 μm or more, required strength can be held, and when the thickness is 200 μm or less, deterioration of flex resistance caused by the bend radius difference in the thickness direction can be prevented. The thickness is more preferably in the range of from 15 to 120 μm.

To the polyarylate in the first embodiment of the present invention, various additives generally used may be added without inhibiting physical properties. Examples of the additives include an ultraviolet absorber, an antioxidant, a color protection agent, a flame retardant and a coloring agent.

A molded article obtained by using the polyarylate in the first embodiment of the present invention has high hardness, specifically, a pencil hardness of H or higher. Further, the pencil hardness thereof is preferably 2H or higher for providing scratch resistance.

Next, the second embodiment of the present invention will be described in detail.

The second embodiment of the present invention is a polyarylate obtained from a dihydric phenol component and an aromatic dicarboxylic acid component, wherein a compound represented by general formula (C) is used at the molecular end of the polyarylate, and wherein the Q value (the amount of molten resin flowing out from a nozzle hole having a diameter of 1 mm and a length of 10 mm using Koka flow tester (high-load-type flow tester) at a temperature of 280° C. under a pressure of 15.69 MPa) is 1×10 $cm^3$/sec or more:

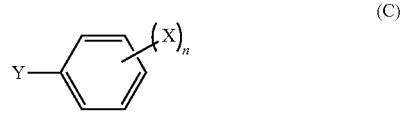

(C)

wherein in the formula, Y represents a hydroxyl group or an acid chloride, n is an integer of 1 to 3, and X is

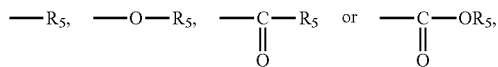

wherein each $R_5$ represents a branched or unbranched alkyl group having 5 to 20 carbon atoms.

The polyarylate in the second embodiment of the present invention is a polyarylate obtained from a dihydric phenol component and an aromatic dicarboxylic acid component, which has a long-chain alkyl group at the molecular end thereof. Specifically, it is an aromatic polyester consisting of a bisphenol residue and an aromatic dicarboxylic acid residue. As production methods thereof, the interfacial polymerization method, the solution polymerization method, the melt polymerization method, etc. are publicly known. In particular, polyarylate resin produced by the interfacial polymerization method has good color tone and physical properties, and therefore is preferred.

In the second embodiment of the present invention, examples of the compound represented by general formula (C) include: monophenols such as ortho-t-amylphenol, para-t-amylphenol, para-hexylphenol, para-t-octylphenol, para-nonylphenol, para-dodecylphenol and 2,4-di-t-amylphenol; monohydroxybenzoic acids such as n-pentyl 4-hydroxybenzoate, n-hexyl 4-hydroxybenzoate, 2-ethylhexyl 4-hydroxybenzoate, n-octyl 4-hydroxybenzoate, n-nonyl 4-hydroxybenzoate, n-dodecyl 4-hydroxybenzoate and n-stearyl 4-hydroxybenzoate; and acid chlorides such as 4-n-pentylbenzoyl chloride, 4-n-hexylbenzoyl chloride, 4-2-ethylhexylbenzoyl chloride, 4-n-octylbenzoyl chloride, 4-n-nonylbenzoyl chloride, 4-n-dodecylbenzoyl chloride and 4-n-stearylbenzoyl chloride. Two or more of these compounds may be used in combination. Among them, ortho-t-amylphenol, para-t-octylphenol, para-nonylphenol, para-dodecylphenol, 2,4-di-t-amylphenol and 2-ethylhexyl 4-hydroxybenzoate are preferred.

Specific examples of dihydric phenols which can be used in the polyarylate in the second embodiment of the present invention include 2,2-bis(4-hydroxyphenyl)propane (bisphenol A), 1,1'-biphenyl-4,4'-diol, 1,1'-biphenyl-3,3'-dimethyl-4,4'-diol, bis(4-hydroxyphenyl)methane, 1,1-bis(4-hydroxyphenyl)ethane, 2,2-bis(4-hydroxy-3-methylphenyl)propane, bis(4-hydroxyphenyl)sulfoxide, bis(4-hydroxyphenyl)sulfide, bis(4-hydroxyphenyl)sulfone, bis(4-hydroxy-3-methylphenyl)sulfone, bis(4-hydroxyphenyl)ketone, 2,2-bis(4-hydroxy-3-t-butylphenyl)propane, 1,1-bis(4-hydroxyphenyl)cyclohexane, 1,1-bis(4-hydroxy-3-methylphenyl)cyclohexane, 1-bis(4-hydroxyphenyl)cyclododecane, 2,2-bis(4-hydroxyphenyl)hexafluoropropane, bis(4-hydroxyphenyl)diphenylmethane, 1,1-bis(4-hydroxyphenyl)-1-phenylethane, 1,1-bis(4-hydroxy-3-methylphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, 4,4'-[1,4-phenylenebis(1-methylethylidene)]bisphenol, bis(4-hydroxyphenyl)ether, 4,4'-[1,4-phenylenebis(1-methylethylidene)]bisphenol, 2,2-bis(4-hydroxyphenyl)-4-methylpentane, 1,1-bis(4-hydroxyphenyl)decane, 2,2-bis(4-hydroxyphenyl)butane, 1,1-bis(4-hydroxyphenyl)-2-methylpropane, 2,2-bis(4-hydroxyphenyl)octane, 1,1-bis(4-hydroxyphenyl)propane, 3,3-bis(4-hydroxyphenyl)pentane, 1,1-bis(4-hydroxyphenyl)-3-methylbutane, 1,1-bis(4-hydroxyphenyl)-2-ethylhexane, 2,2-bis(4-hydroxyphenyl)decane, 1,1-bis(4-hydroxyphenyl)dodecane, 2,2-bis(4-hydroxyphenyl)tridecane and 2,2-bis(4-hydroxy-3-sec-butylphenyl)propane. Two or more of these compounds may be used in combination. Further, among them, bis(4-hydroxyphenyl)ether, 4,4'-[1,3-phenylenebis(1-methylethylidene)]bisphenol, 2,2-bis(4-hydroxyphenyl)-4-methylpentane, 2,2-bis(4-hydroxyphenyl)propane, 2,2-bis(4-hydroxy-3-methylphenyl)propane, 1,1-bis(4-hydroxyphenyl)ethane and 1,1-bis(4-hydroxy-3-methylphenyl)cyclohexane are preferred.

In the polyarylate in the second embodiment of the present invention, the molar ratio of the compound represented by general formula (C) relative to the aforementioned dihydric phenol, specifically relative to the total amount of dihydric phenols used is preferably in the range of from 50:1 to 5:1 (the total amount of dihydric phenols used: the compound of general formula (C)). Within this range, in particular, a balance between flowability and mechanical strength for injection molding can be achieved. The molar ratio is more preferably in the range of from 25:1 to 7:1.

Examples of the aromatic dicarboxylic acid component constituting the polyarylate in the second embodiment of the present invention include terephthalic acid, isophthalic acid, phthalic acid, 2,6-naphthalenedicarboxylic acid, 3-tert-butylisophthalic acid, diphenic acid, 4,4'-dicarboxylic acid and acid chlorides thereof. These divalent dicarboxylic acids may be used solely, or two or more of them may be used in combination. Aromatic dicarboxylic acids which can be particularly preferably used are terephthalic acid, isophthalic acid and acid chlorides thereof.

In the case where the polyarylate in the second embodiment of the present invention is produced by the interfacial polymerization method, an aqueous phase in which the aforementioned dihydric phenols, the compound represented by general formula (C), an alkali and a polymerization catalyst are dissolved is mixed with an organic phase in which the aromatic dicarboxylic acid component is dissolved, and the mixture is subjected to an interfacial polycondensation reaction with stirring, thereby obtaining the polyarylate.

In this case, the polymerization catalyst is preferably a quaternary ammonium salt, and specific examples thereof include tri-n-butylbenzyl ammonium chloride, tri-n-butylbenzyl ammonium bromide, tri-n-butylbenzyl ammonium hydroxide tri-n-butylbenzyl ammonium hydrogen sulfate, tetra-n-butyl ammonium chloride, tetra-n-butyl ammonium bromide, tetra-n-butyl ammonium hydroxide and tetra-n-butyl ammonium hydrogen sulfate.

Examples of the alkali to be used in the aqueous phase include sodium hydroxide and potassium hydroxide.

As a solvent to be used in the organic phase, a solvent which is incompatible with water and dissolves a polyarylate resin produced is used, and specific examples thereof include chlorine-based solvents such as methylene chloride, 1,2-dichloroethane, chloroform, carbon tetrachloride, chlorobenzene, 1,1,2,2-tetrachloroethane, 1,1,1-trichloroethane, o-dichlorobenzene, m-dichlorobenzene and p-dichlorobenzene, and aromatic hydrocarbons such as toluene, benzene and xylene.

The compound represented by general formula (C) is used as an end terminator in order to adjust the molecular weight of the polyarylate in the second embodiment of the present invention, but an end terminator other than that can be used in combination within a range in which such performance can be maintained. Examples thereof include monovalent phenols such as phenol, cresol, p-tert-butylphenol, methyl 4-hydroxybenzoate, n-butyl 4-hydroxybenzoate and benzoyl chloride, hydroxybenzoic acids and acid chlorides. Even in the case where such a compound is used in combination, the amount thereof to be used is preferably less than 50 mol % of the compound represented by general formula (C). Moreover, if desired, a small amount of an antioxidant such as sodium sulfite and hydrosulfite and a branching agent such as phloroglucin, isatin bisphenol and trisphenolethane may be added.

Regarding the polyarylate in the second embodiment of the present invention, the polystyrene equivalent weight-average molecular weight (Mw) thereof measured by gel permeation chromatography (hereinafter abbreviated as "GPC") is preferably 20000 or more and less than 80000. Further, the polystyrene equivalent number-average molecular weight (Mn) thereof is preferably 4000 or more and less than 40000.

The polyarylate in the second embodiment of the present invention can be molded by a publicly-known method such as wet molding, extrusion molding, blow molding and injection molding, but extrusion molding or injection molding is preferred, and injection molding is more preferred.

In the case where the polyarylate in the second embodiment of the present invention is subjected to injection molding, in order to ensure required stability and mold release characteristics, for example, a hindered phenol-based or phosphite-based antioxidant; a silicon-based, fatty acid ester-based, fatty acid-based, fatty acid glyceride-based or natural fat-based (e.g., beeswax) lubricant or mold release agent; a benzotriazol-based, benzophenone-based, dibenzoylmethane-based or salicylate-based ultraviolet absorber or light stabilizer; and an antistatic agent such as polyalkylene glycol and fatty acid glyceride may be suitably used in combination if desired. In addition, from the viewpoint of the cost, etc., the polyarylate may be arbitrarily mixed and used with a general polycarbonate without impairing its performance.

Specific examples of the mold release agent include stearic acid, hydroxystearic acid, cetyl alcohol, stearyl alcohol, butyl stearate, behenyl behenate, ethylene glycol monostearate, stearic acid monoglyceride, pentaerythritol tetrastearate, beeswax, oleic acid monoglyceride, montanoic acid ester, sorbitan laurate ester, polyethylene wax and silicone oil. Among them, stearic acid monoglyceride is preferred.

Specific examples of the antioxidant include antioxidants (stabilizers) such as tris(nonylphenyl)phosphite, tris(2,4-di-t-butylphenyl)phosphite, bis(2,6-di-t-butyl-4-methylphenyl) spiropentaerythritol diphosphate, 2,6-di-t-butyl-4-methylphenol, pentaerythritol tetrakis(3-laurylthiopropionate), tetrakis[methylene-3-(3,5-di-t-butyl-4-hydroxyphenyl)propionate]methane, triphenyl phosphite, distearyl thiodipropionate and cyclic neopentanetetraylbis(2,6-di-t-butyl-4-methylphenyl)phosphite. Among them, cyclic neopentanetetraylbis(2,6-di-t-butyl-4-methylphenyl)phosphite is preferred.

Specific examples of the antistatic agent include alkylbenzene sulfonate, lauryl alcohol sulfate, nonyl phenol ethylene oxide, acrylic ester, polyvinyl sulfonic acid, polyethylene glycol, 1-hydroxyethyl-2-alkylimidazoline, butyl adipate and polyacrylic acid.

Specific examples of the ultraviolet absorber include phenyl salicylate, p-t-butylphenylsalicylate, 2,4-dihydroxybenzophenone, 2-hydroxy-4-methoxybenzophenone, 2-(2-hydroxy-5-t-butylphenyl)benzotriazol, 2-(2-hydroxy-3,5-di-t-butylphenyl)benzotriazol, 2-(2-hydroxy-3,5-dinonylphenyl)benzotriazol, 2-[2-hydroxy-3-(3,4,5,6-tetrahydrophthalimidomethyl)-5-methylphenyl]benzotriazol and 2,2'-methylenebis(4-methyl-6-benzotriazolylphenol).

In addition, it is also possible to add, for example, a perylene-based, perinone-based, anthraquinone-based or heterocycle-based dye.

Two or more types of additives such as the aforementioned antioxidant and mold release agent may be used in combination. The additives may be added without affecting physical properties, and the amount of the additives to be added is 2% by mass or less, and more preferably 1% by mass or less relative to the polyarylate, though it depends on the purpose of use, etc.

The molding temperature in the case where the polyarylate in the second embodiment of the present invention is subjected to injection molding is preferably 280 to 330° C., and more preferably 290 to 320° C. from the viewpoint of flowability and suppression of mold contamination.

Regarding the polyarylate in the second embodiment of the present invention, the flowability thereof required for injection molding is significantly lower than those of conventional polyarylates, and the Q value (the amount of molten resin flowing out from a nozzle hole having a diameter of 1 mm and a length of 10 mm using Koka flow tester (high-load-type flow tester) at a temperature of 280° C. under a pressure of 15.69 MPa), which is an indication of flowability at the time of heating and melting, is $1 \times 10^{-2}$ cm$^3$/sec or more, more preferably 2×10$^{-2}$ cm$^3$/sec or more, and the upper limit thereof is about 90×10$^{-2}$ cm$^3$/sec.

EXAMPLES

Hereinafter, the content of the invention will be described in detail by way of working examples of the first embodiment of the present invention together with comparative examples, but the first embodiment of the present invention is not limited to these working examples.
<GPC Conditions>
The measurement was carried out under the following conditions:
Alliance HPLC system manufactured by Waters;
2 columns of Shodex805L manufactured by Showa Denko K.K.;
a sample of 0.25 w/v % chloroform solution; chloroform eluent of 1 ml/min; and
UV detection at 254 nm.
The polystyrene equivalent weight-average molecular weight (Mw) and number-average molecular weight (Mn) were obtained.
<Pencil Hardness Test>
The hardness of the polyarylate film of the present invention formed on a glass substrate was measured by the pencil hardness test based on JIS K5600-5-4.

Example A1

0.5 g of hydro sulfite and 318 g (1 mol) of 1,1-bis(4-hydroxy-3-methylphenyl)-1-phenylethane represented by the structural formula below (manufactured by Honshu Chemical Industry Co., Ltd., hereinafter abbreviated as "OCAP") were dissolved in 2.3 L of 5 w/w % aqueous solution of sodium hydroxide, 2.1 g of tri-n-butylbenzyl ammonium chloride as a polymerization catalyst was added thereto, and in addition, 2.7 L of methylene chloride solution in which 205 g of a mixture of terephthalic acid chloride and isophthalic acid chloride (1:1) (manufactured by Tokyo Chemical Industry Co., Ltd.) and 6 g of p-tert-butylphenol (manufactured by DIC Corporation, hereinafter abbreviated as "PTBP") were dissolved was added thereto, and the mixture was subjected to an interfacial polycondensation reaction at about 20° C. for 2 hours. After the reaction was completed, the reaction solution was separated into an aqueous phase and an organic phase. The organic phase was neutralized with phosphoric acid and washed with water repeatedly until the conductivity of the wash liquid (aqueous phase) became 10 μS/cm or less. The obtained polymer solution was added dropwise to hot water with its temperature being maintained at 60° C. and the solvent was removed by evaporation, thereby obtaining a powdery white precipitate. The obtained precipitate was filtered and dried at 105° C. for 24 hours, thereby obtaining a polymer powder.

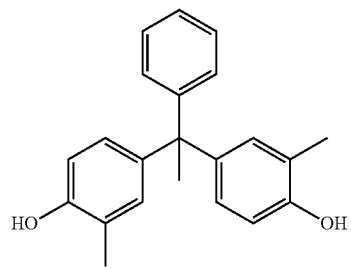 [SMILES: Cc1cc(C(C)(c2ccccc2)c2ccc(O)c(C)c2)ccc1O]

The molecular weight of this polymer obtained by the GPC measurement was as follows: Mw=57700; and Mn=18100. The obtained polymer was analyzed by infrared spectroscopy. As a result, absorption by a carbonyl group or ester group at a position near 1750 cm$^{-1}$ and absorption by an ester bond at a position near 1220 cm$^{-1}$ were recognized, and it was confirmed that it was a polyarylate having an ester bond.

The obtained polyarylate was dissolved in methylene chloride in an amount of 15% by mass, and a cast film was prepared on a glass substrate using a doctor blade. After drying, a film having a thickness of 20 μm was obtained. The obtained film was subjected to the pencil hardness test.

Example A2

The process was carried out in a manner similar to that in Example A1, except that 296 g of 1,1-bis(4-hydroxy-3-methylphenyl)cyclohexane represented by the structural formula below (manufactured by Honshu Chemical Industry Co., Ltd., hereinafter abbreviated as "OCZ") was used instead of OCAP, thereby obtaining a polyarylate with Mw=71400 and Mn=18100. The obtained polyarylate was molded in a manner similar to that in Example A1, and it was subjected to the pencil hardness measurement.

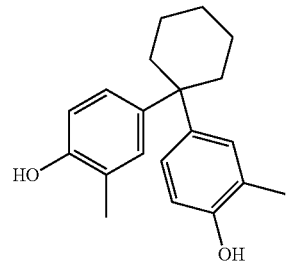 [SMILES: Cc1cc(C2(c3ccc(O)c(C)c3)CCCCC2)ccc1O]

Example A3

The process was carried out in a manner similar to that in Example A1, except that 352 g of 1,1-bis(4-hydroxyphenyl)cyclododecane represented by the structural formula below (manufactured by Taoka Chemical Company, Limited, hereinafter abbreviated as "CD") was used instead of OCAP, thereby obtaining a polyarylate with Mw=64000 and Mn=19400. The obtained polyarylate was molded in a manner similar to that in Example A1, and it was subjected to the pencil hardness measurement.

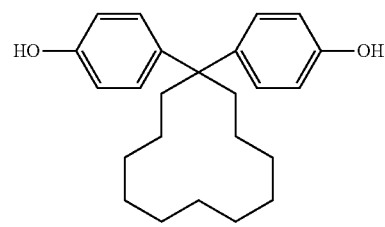 [SMILES: Oc1ccc(C2(c3ccc(O)cc3)CCCCCCCCCCC2)cc1]

Example A4

The process was carried out in a manner similar to that in Example A1, except that the amount of OCAP was changed to 190.8 g and 76 g of 1,1-bis(4-hydroxy-3-methylphenyl)cyclododecane represented by the structural formula below (manufactured by Taoka Chemical Company, Limited, hereinafter abbreviated as "OCCD") and 45.6 g of bisphenol A (manufactured by Mitsubishi Chemical Corporation, hereinafter abbreviated as "BPA") were used additionally, thereby obtaining a polyarylate with Mw=63100 and Mn=19900. The obtained polyarylate was molded in a manner similar to that in Example A1, and it was subjected to the pencil hardness measurement.

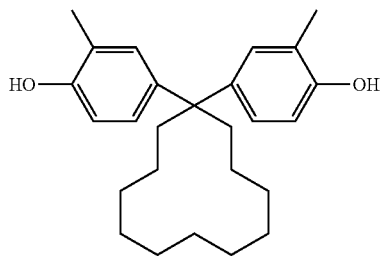 [SMILES: Cc1cc(C2(c3ccc(O)c(C)c3)CCCCCCCCCCC2)ccc1O]

Example A5

The process was carried out in a manner similar to that in Example A1, except that 281.6 g of CD and 51.2 g of 2,2-bis(4-hydroxy-3-methylphenyl)propane (manufactured by Honshu Chemical Industry Co., Ltd., hereinafter abbreviated as "BPC") were used instead of OCAP, thereby obtaining a polyarylate with Mw=64700 and Mn=20000. The obtained polyarylate was molded in a manner similar to that in Example A1, and it was subjected to the pencil hardness measurement.

Example A6

The process was carried out in a manner similar to that in Example A1, except that the amount of OCAP was changed to 222.6 g and 80.4 g of 1,1-bis(4-hydroxyphenyl)cyclohexane (manufactured by Taoka Chemical Company, Limited, hereinafter abbreviated as "BPZ") was used additionally, thereby obtaining a polyarylate with Mw=57000 and Mn=17800. The obtained polyarylate was molded in a manner similar to that in Example A1, and it was subjected to the pencil hardness measurement.

Example A7

5.92 kg (20 mol) of OCZ was dissolved in 45 L of 5 w/w % aqueous solution of sodium hydroxide, 42 g of tri-n-butylbenzyl ammonium chloride as a polymerization catalyst was added thereto, and in addition, 55 L of methylene chloride solution in which 4.1 kg of a mixture of terephthalic acid chloride and isophthalic acid chloride (1:1) (manufactured by Tokyo Chemical Industry Co., Ltd.) and 240 g of PTBP were dissolved was added thereto, and the mixture was subjected to an interfacial polycondensation reaction at about 20° C. for 2 hours. Neutralization, purification, solidification and drying were carried out in a manner similar to that in Example A1, thereby obtaining a polyarylate with Mw=37800 and Mn=9770.

This polyarylate was introduced into a 30 mm single screw extruder with a vent (MK-30 manufactured by Musashino Kikai Co., Ltd.) at a cylinder temperature of 320° C., passed through a feed-block type T-die, and subjected to heat removal using a horizontal twin roll (roll temperature: 150° C.), thereby obtaining an extruded film (thickness: about 110 μm). The obtained film was put on a glass plate and subjected to the pencil hardness test in a manner similar to that in Example A1.

Comparative Example A1

The process was carried out in a manner similar to that in Example A1, except that 228 g of BPA was used instead of OCAP, thereby obtaining a polyarylate with Mw=78300 and Mn=24400. The obtained polyarylate was molded in a manner similar to that in Example A1, and it was subjected to the pencil hardness measurement.

Comparative Example A2

The process was carried out in a manner similar to that in Example A1, except that 268 g of BPZ was used instead of OCAP, thereby obtaining a polyarylate with Mw=57700 and Mn=11200. The obtained polyarylate was molded in a manner similar to that in Example A1, and it was subjected to the pencil hardness measurement.

Comparative Example A3

The process was carried out in a manner similar to that in Example A1, except that 290 g of 1,1-bis(4-hydroxyphenyl)-1-phenylethane (manufactured by Honshu Chemical Industry Co., Ltd., hereinafter abbreviated as "BPAP") was used instead of OCAP, thereby obtaining a polyarylate with Mw=48600 and Mn=15300. The obtained polyarylate was molded in a manner similar to that in Example A1, and it was subjected to the pencil hardness measurement.

Comparative Example A4

The process was carried out in a manner similar to that in Example A1, except that 256 g of BPC was used instead of OCAP, thereby obtaining a polyarylate with Mw=66800 and Mn=17400. The obtained polyarylate was molded in a manner similar to that in Example A1, and it was subjected to the pencil hardness measurement.

The results of Examples A1 to A7 and Comparative Examples A1 to A4 are shown in Table 1.

TABLE 1

| | (A) dihydric phenol | | (B) dihydric phenol | | Other dihydric phenols | | Weight-average | Pencil |
| --- | --- | --- | --- | --- | --- | --- | --- | --- |
| | Type | mol % | Type | mol % | Type | mol % | molecular weight (Mw) | Hardness |
| Example A1 | OCAP | 100 | — | — | — | — | 57700 | 2H |
| Example A2 | — | — | OCZ | 100 | — | — | 71400 | 2H |
| Example A3 | — | — | CD | 100 | — | — | 64000 | 3H |
| Example A4 | OCAP | 60 | OCCD | 20 | BPA | 20 | 63100 | 2H |
| Example A5 | — | — | CD | 80 | BPC | 20 | 64700 | 3H |
| Example A6 | OCAP | 70 | — | — | BPZ | 30 | 57000 | 2H |

TABLE 1-continued

| | (A) dihydric phenol | | (B) dihydric phenol | | Other dihydric phenols | | Weight-average | Pencil |
|---|---|---|---|---|---|---|---|---|
| | Type | mol % | Type | mol % | Type | mol % | molecular weight (Mw) | Hardness |
| Example A7 | — | — | OCZ | 100 | — | — | 37800 | 2H |
| Comparative Example A1 | — | — | — | — | BPA | 100 | 78300 | B |
| Comparative Example A2 | — | — | — | — | BPZ | 100 | 57700 | F |
| Comparative Example A3 | — | — | — | — | BPAP | 100 | 48600 | HB |
| Comparative Example A4 | — | — | — | — | BPC | 100 | 66800 | F |

Hereinafter, the content of the invention will be described in detail by way of working examples of the second embodiment of the present invention together with comparative examples, but the second embodiment of the present invention is not limited to these working examples.

<GPC Conditions>

The measurement was carried out under the following conditions:
Alliance HPLC system manufactured by Waters;
2 columns of Shodex805L manufactured by Showa Denko K.K.;
a sample of 0.25 w/v % chloroform solution; chloroform eluent of 1 ml/min; and
UV detection at 254 nm.

The polystyrene equivalent weight-average molecular weight (Mw) and number-average molecular weight (Mn) were obtained.

<Flowability (Q Value) Measurement Conditions>

The amount of molten resin flowing out from a nozzle hole (orifice) having a diameter of 1 mm and a length of 10 mm (unit: ×10$^{-2}$ cm$^3$/sec) was measured using an elevated flow tester (CFT-500D manufactured by Shimadzu Corporation) at a temperature of 280° C. under a pressure of 15.69 MPa.

<Evaluation of Injection Molding>

A tensile dumbbell specimen of JIS7 having a thickness of 1 mm was injection-molded using a small injection molding machine (C. Mobile manufactured by Shinko Sellbic Co., Ltd.) under the following conditions: injection pressure: 283 MPa, injection velocity: 20 mm/sec, resin temperature of polyarylate: 320° C., and mold temperature: 100° C. When it was impossible to carry out molding at a resin temperature of 320° C., the resin temperature was set at 360° C. and the mold temperature was set at 150° C.

<Evaluation of Mold Contamination at the Time of Injection Molding>

Injection molding of 500 shots was carried out under the aforementioned conditions for the evaluation of injection molding, and after that, the surface of the mold was wiped by a waste cloth and the presence or absence of an attached matter was confirmed. The case where no attached matter was confirmed was evaluated as ○, and the case where an attached matter was confirmed was evaluated as ×.

Example B1

0.5 g of hydrosulfite and 228 g (1 mol) of bisphenol A (manufactured by Mitsubishi Chemical Corporation, hereinafter abbreviated as "BPA") were dissolved in 2.3 L of 5 w/w % aqueous solution of sodium hydroxide, 2.1 g of tri-n-butylbenzyl ammonium chloride as a polymerization catalyst was added thereto, and in addition, 2.7 L of methylene chloride solution in which 205 g of a mixture of terephthalic acid chloride and isophthalic acid chloride (1:1) (manufactured by Tokyo Chemical Industry Co., Ltd.) and 21.0 g of para-dodecylphenol represented by the structural formula below (manufactured by Petrochemical Schenectady Co., Ltd., hereinafter abbreviated as "PDP") were dissolved was added thereto, and the mixture was subjected to an interfacial polycondensation reaction at about 20° C. for 2 hours. After the reaction was completed, the reaction solution was separated into an aqueous phase and an organic phase. The organic phase was neutralized with phosphoric acid and washed with water repeatedly until the conductivity of the wash liquid (aqueous phase) became 10 μS/cm or less. The obtained polymer solution was added dropwise to hot water with its temperature being maintained at 60° C. and the solvent was removed by evaporation, thereby obtaining a powdery white precipitate. The obtained precipitate was filtered and dried at 105° C. for 24 hours, thereby obtaining a polymer powder.

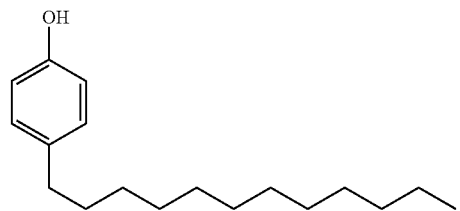 [SMILES: CCCCCCCCCCCCc1ccc(O)cc1]

The molecular weight of this polymer obtained by the GPC measurement was as follows: Mw=38300; and Mn=8940. The obtained polymer was analyzed by infrared spectroscopy. As a result, absorption by a carbonyl group or ester group at a position near 1750 cm$^{-1}$ and absorption by an ester bond at a position near 1220 cm$^{-1}$ were recognized, and it was confirmed that it was a polyarylate having an ester bond.

0.03% by mass of stearic acid monoglyceride (manufactured by Kao Corporation) as a mold release agent and 0.03% by mass of cyclic neopentanetetraylbis(2,6-di-t-butyl-4-methylphenyl)phosphite (ADEKA STAB PEP-36 manufactured by ADEKA Corporation) which is a phosphite-based antioxidant were added to and mixed with the obtained polyarylate. After that, the mixture was compressed at 300° C. and 9.8 MPa for 5 minutes to obtain a solid, it was coarsely crushed, and it was subjected to the measurement of the Q value and injection molding at 320° C.

Example B2

The process was carried out in a manner similar to that in Example B1, except that 256 g of 2,2-bis(4-hydroxy-3- methylphenyl)propane (manufactured by Honshu Chemical Industry Co., Ltd., hereinafter abbreviated as "BPC") was used instead of BPA and 13.1 g of ortho-t-amylphenol represented by the structural formula below (manufactured by Petrochemical Schenectady Co., Ltd., hereinafter abbreviated as "OTAP") was used instead of PDP, thereby obtaining a polyarylate with Mw=33200 and Mn=8880. The obtained polyarylate was subjected to the evaluation of molding in a manner similar to that in Example B1.

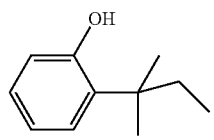

Example B3

The process was carried out in a manner similar to that in Example B1, except that 296 g of 1,1-bis(4-hydroxy-3-methylphenyl)cyclohexane (manufactured by Honshu Chemical Industry Co., Ltd., hereinafter abbreviated as "OCZ") was used instead of BPA and 18.7 g of 2,4-di-t-amylphenol represented by the structural formula below (manufactured by Petrochemical Schenectady Co., Ltd., hereinafter abbreviated as "DTAP") was used instead of PDP, thereby obtaining a polyarylate with Mw=37600 and Mn=8960. The obtained polyarylate was subjected to the evaluation of molding in a manner similar to that in Example B1.

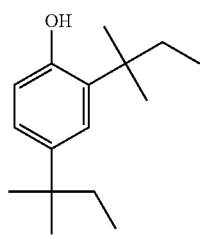 [SMILES: CCC(C)(C)c1ccc(O)c(C(C)(C)CC)c1]

Example B4

The process was carried out in a manner similar to that in Example B1, except that 214 g of 1,1-bis(4-hydroxyphenyl)ethane (manufactured by Honshu Chemical Industry Co., Ltd., hereinafter abbreviated as "BPE") was used instead of BPA and 20.0 g of 2-ethylhexyl 4-hydroxybenzoate represented by the structural formula below (manufactured by Ueno Fine Chemicals Industry, Ltd., hereinafter abbreviated as "POEH") was used instead of PDP, thereby obtaining a polyarylate with Mw=38900 and Mn=10600. The obtained polyarylate was subjected to the evaluation of molding in a manner similar to that in Example B1.

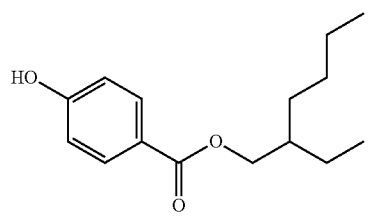 [SMILES: CCCCC(CC)COC(=O)c1ccc(O)cc1]

Example B5

The process was carried out in a manner similar to that in Example B1, except that 270 g of 2,2-bis(4-hydroxyphenyl)-4-methylpentane (manufactured by Honshu Chemical Industry Co., Ltd., hereinafter abbreviated as "MIBK") was used instead of BPA and 17.6 g of para-nonylphenol represented by the structural formula below (manufactured by Petrochemical Schenectady Co., Ltd., hereinafter abbreviated as "PNP") was used instead of PDP, thereby obtaining a polyarylate with Mw=36200 and Mn=9920. The obtained polyarylate was subjected to the evaluation of molding in a manner similar to that in Example B1.

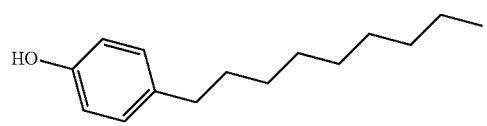 [SMILES: CCCCCCCCCc1ccc(O)cc1]

Example B6

The process was carried out in a manner similar to that in Example B1, except that 101 g of bis(4-hydroxyphenyl) ether (manufactured by DIC Corporation, hereinafter abbreviated as "DHPE") and 173 g of 4,4'-[1,3-phenylenebis(1-methylethylidene)]bisphenol (manufactured by Mitsui Fine Chemicals, Inc., hereinafter abbreviated as "BPM") were used instead of BPA and 13.7 g of para-t-octylphenol represented by the structural formula below (manufactured by DIC Corporation, hereinafter abbreviated as "PTOP") was used instead of PDP, thereby obtaining a polyarylate with Mw=45900 and Mn=12000. The obtained polyarylate was subjected to the evaluation of molding in a manner similar to that in Example B1.

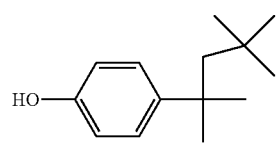

Comparative Example B1

The process was carried out in a manner similar to that in Example B1, except that 12 g of p-tert-butylphenol represented by the structural formula below (manufactured by DIC Corporation, hereinafter abbreviated as "PTBP") was used instead of PDP, thereby obtaining a polyarylate with Mw=39600 and Mn=12300. The obtained polyarylate was subjected to the evaluation of molding in a manner similar to that in Example B1, but since it was impossible to carry out injection molding at 320° C., injection molding was carried out at 360° C.

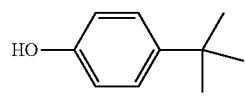

Comparative Example B2

The process was carried out in a manner similar to that in Example B4, except that 12 g of PTBP was used instead of POEH, thereby obtaining a polyarylate with Mw=39400 and Mn=11100. The obtained polyarylate was subjected to the evaluation of molding in a manner similar to that in Example B1, but since it was impossible to carry out injection molding at 320° C., injection molding was carried out at 360° C.

Comparative Example B3

The process was carried out in a manner similar to that in Example B1, except that 2.7 g of p-tert-butylphenol (manufactured by DIC Corporation, hereinafter abbreviated as "PTBP") was used instead of PDP, thereby obtaining a polyarylate with Mw=114000 and Mn=22700. The obtained polyarylate was subjected to the evaluation of molding in a manner similar to that in Example B1. However, in the Q value measurement, almost no resin flowed, and there was almost no slope of the amount of flow relative to time, and therefore, it was evaluated as "not detected" (ND). In addition, since it was impossible to carry out injection molding at 320° C., injection molding was carried out at 360° C. However, even at 360° C., it did not lead to filling of resin into a mold and it was impossible to carry out injection molding of 500 shots.

The results of Examples B1 to B6 and Comparative Examples B1 to B3 are shown in Table 2.

phenyl)ether, 4,4'-[1,3-phenylenebis(1-methylethylidene)]bisphenol, 2,2-bis(4-hydroxyphenyl)-4-methylpentane, 2,2-bis(4-hydroxyphenyl)propane, 2,2-bis(4-hydroxy-3-methylphenyl)propane, 1,1-bis(4-hydroxyphenyl)ethane and 1,1-bis(4-hydroxy-3-methylphenyl)cyclohexane, wherein a compound represented by general formula (C) is used at a molecular end of the polyarylate, and wherein a Q value (the amount of molten resin flowing out from a nozzle hole having a diameter of 1 mm and a length of 10 mm using Koka flow tester (high-load-type flow tester) at a temperature of 280° C. under a pressure of 15.69 MPa) of the polyarylate is $1 \times 10^{-2}$ cm$^3$/sec or more:

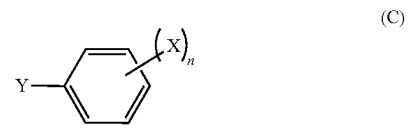

(C)

wherein in the formula, Y represents a hydroxyl group or an acid chloride, n is an integer of 1 to 3, and X is

TABLE 2

| | Dihydric phenols | | | | Compound of formula (C) | Polymerization degree set | Weight-average molecular weight | Q value | Injection molding | Mold contamination at the time of injection molding |
|---|---|---|---|---|---|---|---|---|---|---|
| | Type | mol % | Type | mol % | Type | (n) | (Mw) | ($\times 10^{-2}$ cm$^3$/sec) | at 320° C. | |
| Example B1 | BPA | 100 | | | PDP | 25 | 38300 | 2.0 | Possible | ○ |
| Example B2 | BPC | 100 | | | OTAP | 25 | 33200 | 4.0 | Possible | ○ |
| Example B3 | OCZ | 100 | | | DTAP | 25 | 37600 | 3.4 | Possible | ○ |
| Example B4 | BPE | 100 | | | POEH | 25 | 38900 | 2.5 | Possible | ○ |
| Example B5 | MIBK | 100 | | | PNP | 25 | 36200 | 5.6 | Possible | ○ |
| Example B6 | DHPE | 50 | BPM | 50 | PTOP | 30 | 45900 | 4.4 | Possible | ○ |
| Comparative Example B1 | BPA | 100 | | | PTBP | 25 | 39600 | 0.2 | Impossible | × |
| Comparative Example B2 | BPE | 100 | | | PTBP | 25 | 39400 | 0.4 | Impossible | × |
| Comparative Example B3 | BPA | 100 | | | PTBP | 110 | 114000 | ND | Impossible | Impossible |

INDUSTRIAL APPLICABILITY

Regarding application examples of the present invention, for example, it is possible to provide front plates of flat panel displays and touch panel displays for portable devices which require scratch resistance. The polyarylate of the present invention can be injection-molded at a temperature lower than conventional polyarylates, and this realizes energy saving. Further, mold contamination caused by a mold release agent or additive is reduced, and this contributes to ease of maintenance. Moreover, the present invention can be applied to various injection-molded articles, regarding which high flowability is desired at the time of heating and melting, in particular, light-guiding plates of flat panel displays, various optical lenses, lighting covers, etc.

The invention claimed is:

1. A molded article obtained by injection molding or extrusion molding a polyarylate obtained from a dihydric phenol component and an aromatic dicarboxylic acid component,
wherein the dihydric phenol component is at least one selected from the group consisting of bis(4-hydroxy-

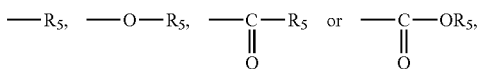

wherein each $R_5$ represents a branched or unbranched alkyl group having 5 to 20 carbon atoms, and
wherein the compound represented by general formula (C) is at least one selected from the group consisting of ortho-t-amylphenol, para-nonylphenol, para-dodecylphenol, 2,4-di-t-amylphenol, and 2-ethylhexyl-4-hydroxybenzoate.

2. The molded article according to claim 1, wherein the polystyrene equivalent weight-average molecular weight of the polyarylate measured by gel permeation chromatography is 20000 or more and less than 80000.

3. The molded article according to claim 1,
wherein the dihydric phenol component is at least one selected from the group consisting of bis(4-hydroxyphenyl)ether, 4,4'-[1,3-phenylenebis(1-methyl ethylidene)]bisphenol, and 2,2-bis(4-hydroxyphenyl)-4-methylpentane.

4. The molded article according to claim 1,
wherein the dihydric phenol component is at least one selected from the group consisting of 2,2-bis(4-hydroxyphenyl)propane, 2,2-bis(4-hydroxy-3-methylphenyl)propane, and 1,1-bis(4-hydroxyphenyl)ethane, and 1,1-bis(4-hydroxy-3-methylphenyl)cyclohexane.

5. The molded article according to claim 1,
wherein the dihydric phenol component is bis(4-hydroxyphenyl)ether.

6. The molded article according to claim 1,
wherein the dihydric phenol component is 2,2-bis(4-hydroxyphenyl)-4-methylpentane.

7. The molded article according to claim 1,
wherein the dihydric phenol component is 2,2-bis(4-hydroxyphenyl)propane.

8. The molded article according to claim 1,
wherein the dihydric phenol component is 2,2-bis(4-hydroxy-3-methylphenyl)propane.

9. The molded article according to claim 1,
wherein the dihydric phenol component is 1,1-bis(4-hydroxyphenyl)ethane.

10. The molded article according to claim 1,
wherein the dihydric phenol component is 1,1-bis(4-hydroxy-3-methylphenyl)cyclohexane.

11. The molded article according to claim 1,
wherein the compound represented by general formula (C) is ortho-t-amylphenol.

12. The molded article according to claim 1,
wherein the compound represented by general formula (C) is para-nonylphenol.

13. The molded article according to claim 1,
wherein the compound represented by general formula (C) is para-dodecylphenol.

14. The molded article according to claim 1,
wherein the compound represented by general formula (C) is 2,4-di-t-amylphenol.

15. The molded article according to claim 1,
wherein the compound represented by general formula (C) is 2-ethylhexyl 4-hydroxybenzoate.

16. A molded article obtained by injection molding or extrusion molding a polyarylate obtained from a dihydric phenol component and an aromatic dicarboxylic acid component,
wherein the dihydric phenol component is 2,2-bis(4-hydroxyphenyl)propane,
wherein a compound represented by general formula (C) is used at a molecular end of the polyarylate, and wherein a Q value (the amount of molten resin flowing out from a nozzle hole having a diameter of 1 mm and a length of 10 mm using Koka flow tester (high-load-type flow tester) at a temperature of 280° C. under a pressure of 15.69 MPa) is $1 \times 10^{-2}$ cm$^3$/sec or more:

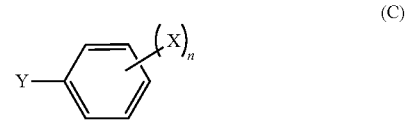

(C)

wherein in the formula, Y represents a hydroxyl group or an acid chloride, n is an integer of 1 to 3, and X is

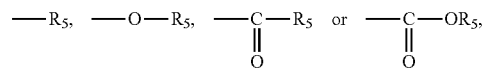

wherein each $R_5$ represents a branched or unbranched alkyl group having 5 to 20 carbon atoms, and
wherein the compound represented by general formula (C) is para-dodecylphenol.

* * * * *